United States Patent
Takeuchi et al.

(10) Patent No.: US 7,281,599 B2
(45) Date of Patent: Oct. 16, 2007

(54) PASSENGER PROTECTION SYSTEM

(75) Inventors: Hiroyoshi Takeuchi, Kariya (JP); Seiya Ide, Okazaki (JP)

(73) Assignee: Denso Corporation, Kariya (JP)

( * ) Notice: Subject to any disclaimer, the term of this patent is extended or adjusted under 35 U.S.C. 154(b) by 311 days.

(21) Appl. No.: 10/983,628

(22) Filed: Nov. 9, 2004

(65) Prior Publication Data
US 2005/0155805 A1 Jul. 21, 2005

(30) Foreign Application Priority Data
Jan. 16, 2004 (JP) ............................. 2004-009175

(51) Int. Cl.
*B60K 28/10* (2006.01)
(52) U.S. Cl. ...................... 180/274; 280/735
(58) Field of Classification Search .................. 701/45; 280/735; 180/274, 282
See application file for complete search history.

(56) References Cited

U.S. PATENT DOCUMENTS

| | | | | |
|---|---|---|---|---|
| 5,322,323 A | * | 6/1994 | Ohno et al. | 280/730.2 |
| 5,363,303 A | * | 11/1994 | Kaneko et al. | 701/45 |
| 5,995,892 A | | 11/1999 | Kiribayashi et al. | |
| 2001/0025215 A1 | * | 9/2001 | Hermann | 701/45 |
| 2003/0120408 A1 | | 6/2003 | Caruso et al. | |
| 2004/0160045 A1 | * | 8/2004 | Miura | 280/735 |
| 2005/0161920 A1 | * | 7/2005 | Higuchi et al. | 280/735 |

FOREIGN PATENT DOCUMENTS

| | | |
|---|---|---|
| EP | 0 531 989 A1 | 3/1993 |
| EP | 1 227 010 A2 | 7/2002 |
| JP | A 09-240418 | 9/1997 |

* cited by examiner

*Primary Examiner*—Paul N. Dickson
*Assistant Examiner*—Tiffany L. Webb
(74) *Attorney, Agent, or Firm*—Oliff & Berridge, PLC

(57) ABSTRACT

A passenger protection system includes acceleration sensors as well as a passenger protection ECU. At least one acceleration sensor is provided on one of the width-direction sides of the vehicle and at least one accelerator sensor is provided on the other width-direction side of the vehicle. Based on signals generated by the acceleration sensors the passenger protection ECU determines occurrence of a collision, and drives passenger protection apparatus accordingly. In the event of a collision, the passenger protection ECU performs an AND operation on a signal from the acceleration sensor on the colliding one of the width-direction sides of the vehicle, and a signal from the acceleration sensor on the other width-direction side not experiencing the collision, to drive the passenger protection apparatus.

9 Claims, 8 Drawing Sheets

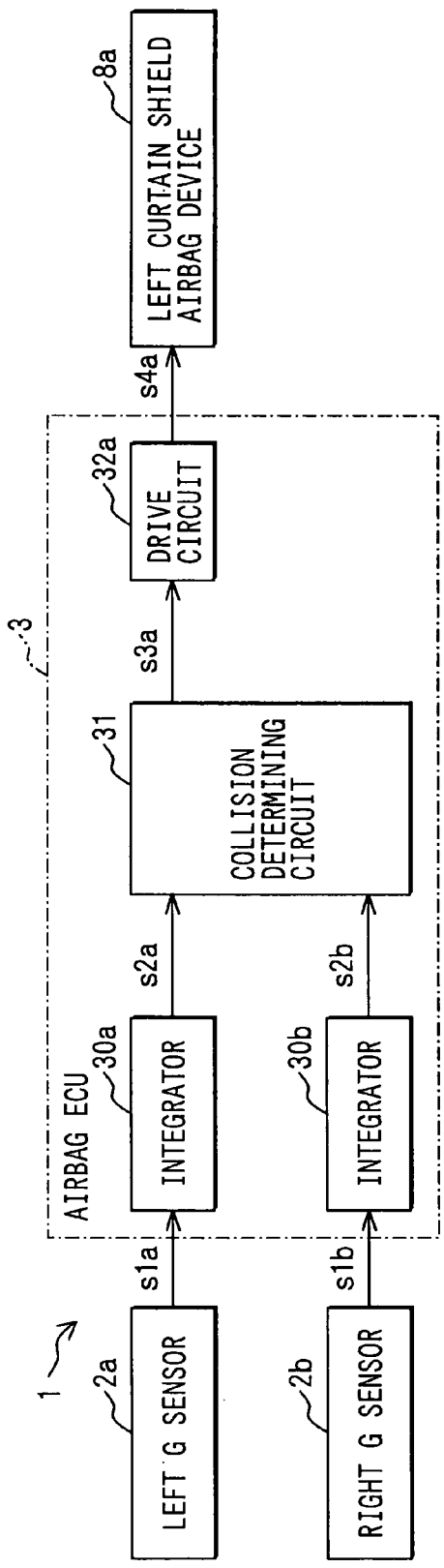
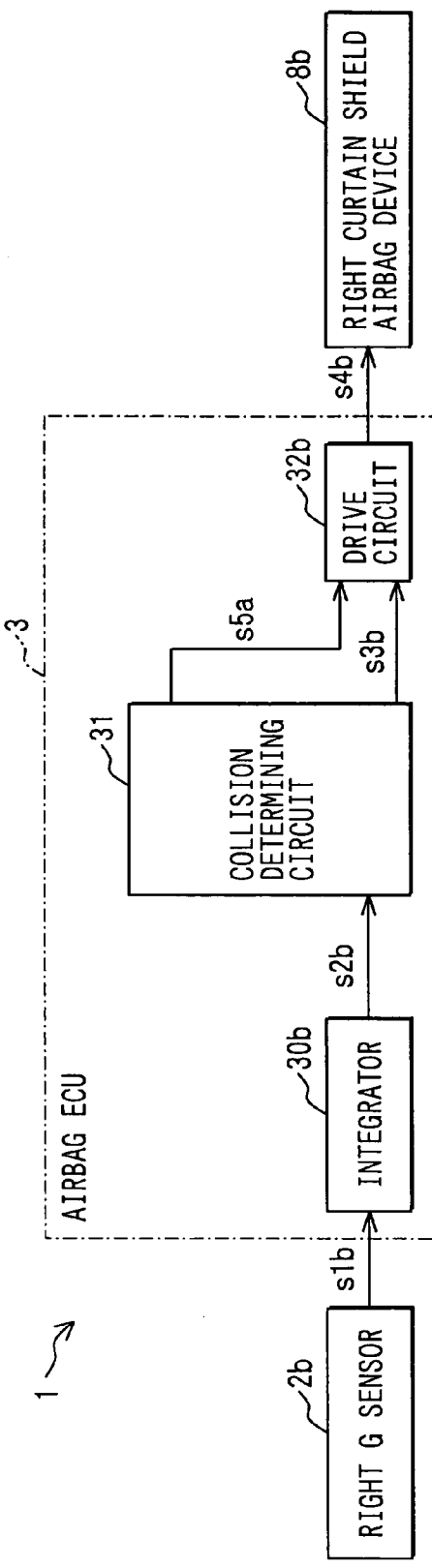

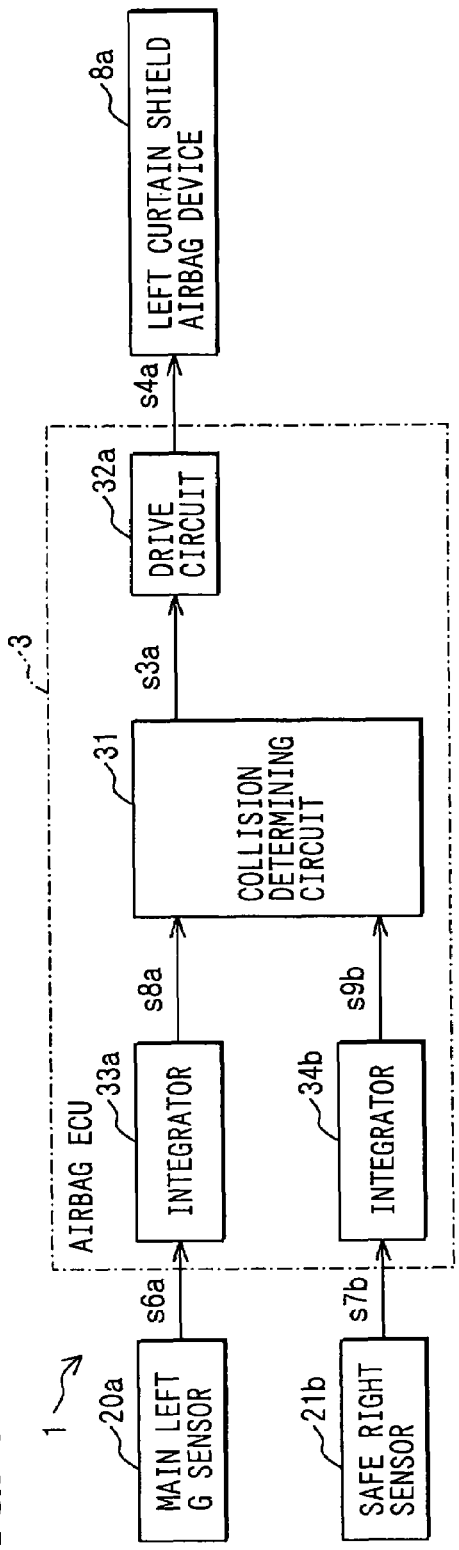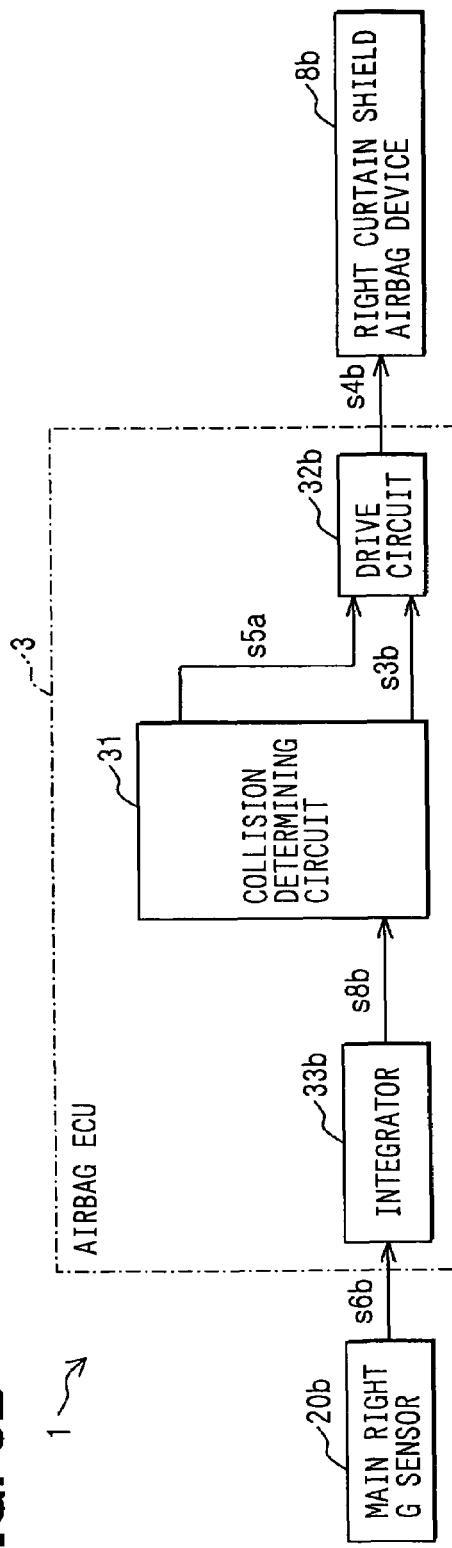

PASSENGER PROTECTION SYSTEM

CROSS REFERENCE TO RELATED APPLICATIONS

This application is based upon, claims the benefit of priority of, and incorporates by reference the contents of, Japanese Patent Application No. 2004-9175 filed on Jan. 16, 2004.

FIELD OF THE INVENTION

The present invention relates to a passenger protection system for protecting passengers by operating a passenger protection apparatus such as an airbag apparatus and/or a seat-belt apparatus at a vehicle collision time.

BACKGROUND OF THE INVENTION

An airbag system comprises an airbag ECU (Electronic Control Unit) and side-direction G sensors for side-collision use (use in collisions in a side direction). The airbag ECU is provided at the center of the floor of a vehicle. The airbag ECU includes an embedded floor G sensor for side-collision use. The side-direction G sensors are provided on B pillars on both the vehicle-width-direction sides of the vehicle. Thus, there are a total of two side-direction G sensors.

In the event of a side collision, a signal from a side-direction G sensor for side-collision use and a signal from the floor G sensor for side-collision use are supplied to an AND operation. That is, when both moving average deviations of interval integrations of acceleration waveforms from the sensors exceed their respective threshold values, a collision-side curtain shield airbag apparatus or a side airbag apparatus is driven.

However, the airbag ECU includes not only the floor G sensor for side-collision use, but also an embedded floor G sensor for front-collision use (use in collisions in the forward direction). Thus, in the case of the airbag system, the size of the airbag ECU is inevitably large.

JP-A No. 9-240418 discloses an airbag system for driving a side airbag apparatus by using only a signal from a side-direction G sensor for side-collision use. In accordance with the airbag system described in this patent reference, it is not necessary to provide the airbag ECU with a floor G sensor for side-collision use. In this way, the airbag ECU can be made compact.

However, only a signal from a side-direction G sensor for side-collision use is used to determine whether the side airbag apparatus is to be driven or not to be driven. It is thus necessary to raise a threshold value to prevent the side airbag apparatus from operating when, for example, a small impact (such as a hammering shock) locally hits the side-direction G sensor for side-collision use. As a result, it is sometimes difficult to determine at an early stage whether or not a collision has occurred.

SUMMARY OF THE INVENTION

Accordingly, it is an object of the present invention to provide a passenger protection system that is capable of determining whether a passenger protection apparatus is to be driven or not to be driven based on only acceleration sensors provided on both the width-direction sides of the vehicle and carrying out highly reliable operations.

It is another object of the present invention to drive the passenger protection apparatus with a high degree of reliability at times of second and subsequent side-direction collisions in the event of consecutive side-direction collisions occurring on the left and right sides.

A passenger protection system in accordance with the above objects comprises at least an acceleration sensor provided on each of both the width-direction sides of the vehicle, and a passenger protection ECU for determining if a collision has occurred based on signals from the acceleration sensors and also for driving a passenger protection apparatus accordingly. The passenger protection ECU performs an AND operation on a signal from the acceleration sensor provided on a colliding one of the width-direction sides of the vehicle, and a signal from the acceleration sensor provided on the width-direction side not experiencing the collision, to drive the passenger protection apparatus when it determines that a collision occurred.

As described above, the passenger protection ECU drives the passenger protection apparatus by performing an AND operation on signals from the acceleration sensors provided on the width-direction sides of the vehicle. In accordance with the passenger protection system provided by the present invention, signals from a plurality of acceleration sensors are used for determining whether or not the passenger protection apparatus is to be driven or not to be driven. Thus, its operation reliability is high. In addition, in accordance with the passenger protection system provided by the present invention, preferably only signals from a plurality of acceleration sensors are used for determining whether or not the passenger protection apparatus is to be driven or not to be driven. Thus, for determining a collision in the side direction, another acceleration sensor such as an acceleration sensor embedded in the passenger protection ECU is not required.

Preferably, in the event of consecutive side-direction collisions occurring on the left and right sides, the passenger protection ECU latches a signal generated in an (n-1)th side-direction collision by the acceleration sensor provided on the width-direction side experiencing the collision (where n≧2) and, in an nth side-direction collision, the passenger protection ECU uses the latched signal as a safe signal and a signal from the acceleration sensor provided on the width-direction side experiencing the collision as a main G signal.

In the event of consecutive side-direction collisions occurring on the left and right sides, conceivably, there are cases in which the AND operation cited above cannot be performed. Assuming, for example, that the acceleration sensors of both the width-direction sides of the vehicle are each installed on the B pillar or the like at a location adjacent to the outer cabinet of the vehicle, when a first collision occurs on the left side and a second collision consecutively occurs on the right side, a problem is most likely raised in the acceleration sensor provided on the left side. As a result, no signal is most likely transmitted normally from the acceleration sensor provided on the left side to the passenger protection ECU.

In this case, in this configuration, a signal generated by the acceleration sensor on the collision side (the left side in this example) in the (n-1)th side-direction collision (or the first collision in this example) is temporarily stored. Then, in the nth side-direction collision (or the second collision in this example), an AND operation is performed by using the stored signal as a safe signal and a signal from the acceleration sensor provided on the collision side (or the right side in this example) as a main G signal. Thus, in accordance with this configuration, even when a problem is raised in the acceleration sensor due to the (n-1)th collision, the passenger protection apparatus can be driven in the nth collision.

In accordance with the present invention, only acceleration sensors provided on both the width-direction sides of the vehicle are used for determining whether a passenger protection apparatus is to be driven or not to be driven.

BRIEF DESCRIPTION OF THE DRAWINGS

The above and other objects, features and advantages of the present invention will become more apparent from the following detailed description made with reference to the accompanying drawings. In the drawings:

FIGS. 4A and 4B are diagrams showing flows of signals generated in the event of consecutive side-direction collisions occurring on the left and right sides;

FIGS. 8A and 8B are diagrams showing flow of signals generated in the event of consecutive side-direction collisions occurring on the left and right sides.

DETAILED DESCRIPTION OF THE PREFERRED EMBODIMENT

First Embodiment

Figure 1:
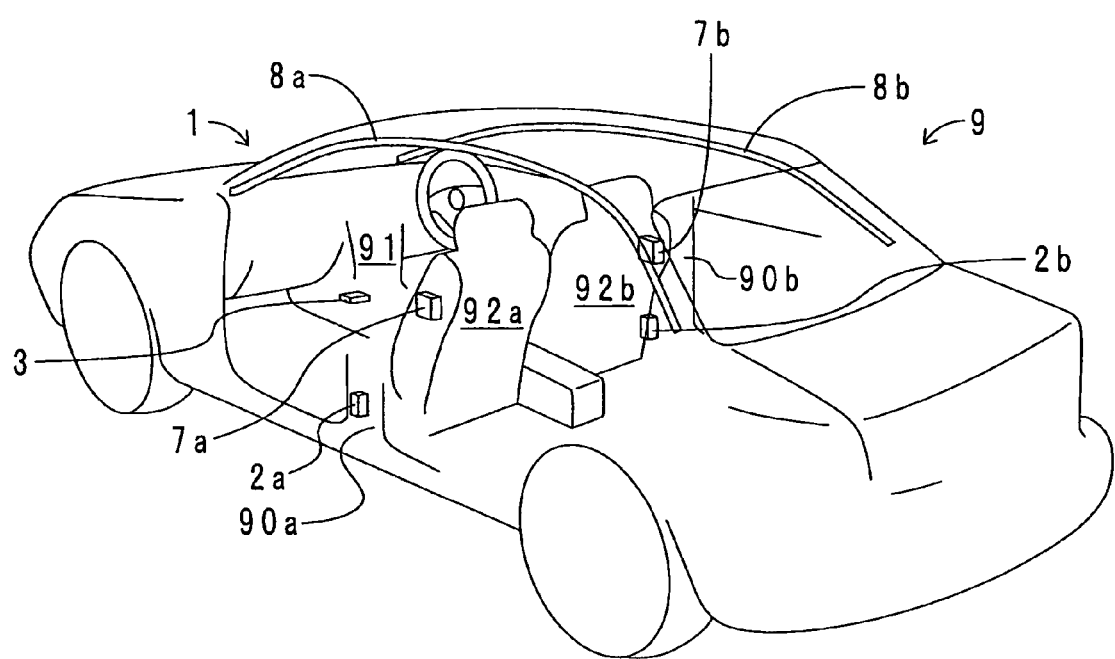
FIG. 1 is a diagram showing a layout of an airbag system implemented by a first embodiment.

Referring to FIG. 1, a first embodiment of an airbag system will be discussed. The airbag system 1 includes a left side direction G sensor 2a (left G sensor), a right side direction G sensor 2b (right G sensor), and an airbag ECU 3. The left side direction G sensor 2a and the right side direction G sensor 2b constitute an acceleration sensor. The airbag ECU 3 constitutes a passenger protection ECU. The left side direction G sensor 2a is installed on a left side direction B pillar 90a of the vehicle body 9. The right side direction G sensor 2b is installed on a right side direction B pillar 90b of the vehicle body 9. The airbag ECU 3 is installed below a center cluster 91 above a floor tunnel.

On the left edge of the ceiling of the vehicle body 9, a left side direction curtain shield airbag apparatus 8a is provided. On the right edge of the ceiling of the vehicle body 9, a right side direction curtain shield airbag apparatus 8b is provided. Both the left side direction curtain shield airbag apparatus 8a and the right side direction curtain shield airbag apparatus 8b constitute a passenger protection apparatus. On the left shoulder of a front passenger seat 92a, a left side direction airbag apparatus 7a is installed. On the right shoulder of a driver seat 92b, on the other hand, a right side direction airbag apparatus 7b is installed.

Figure 2:
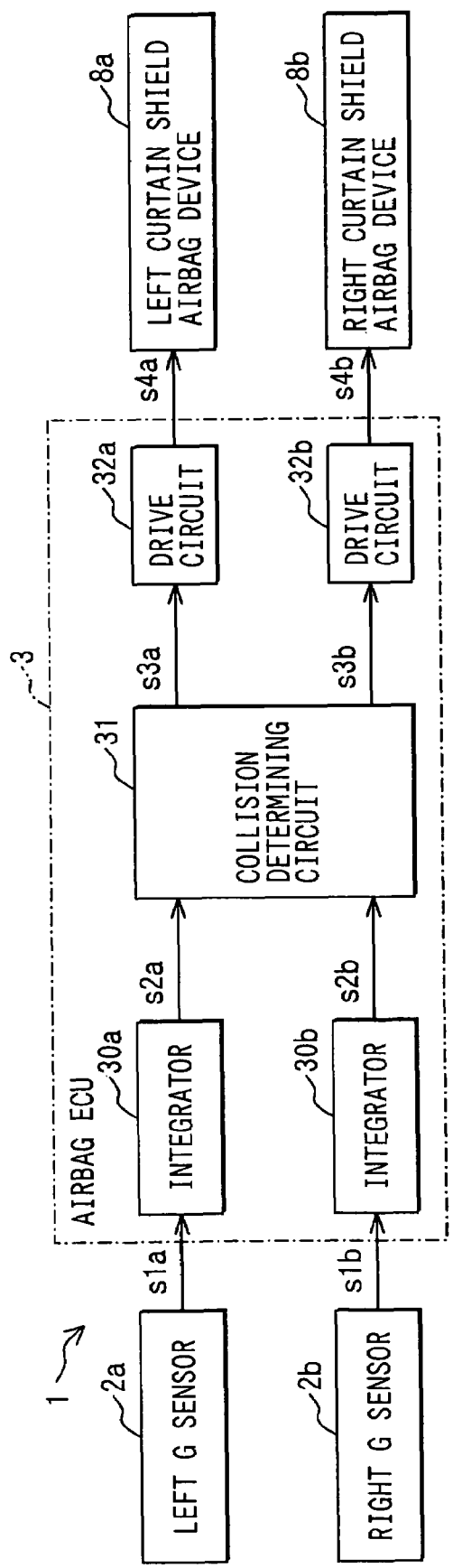
FIG. 2 is a block diagram showing the airbag system.

FIG. 2 is a block diagram showing the airbag system of the embodiment. The airbag ECU 3 comprises integration-value-processing circuits (integrators) 30a and 30b, a collision determining circuit 31 and drive circuits 32a and 32b. The integration-value-processing circuit 30a performs interval integration during a predetermined time interval on an acceleration waveform received from the left side direction G sensor 2a to find a moving average deviation. The integration-value-processing circuit 30b performs interval integration during a predetermined time interval on an acceleration waveform received from the right side direction G sensor 2b to find a moving average deviation. The collision determining circuit 31 compares each of the computed moving average deviations with a predetermined threshold value to determine whether a physical impact on the vehicle is a collision or a non-collision. The drive circuit 32a drives the left side direction curtain shield airbag apparatus 8a in accordance with a driving signal received from the collision determining circuit 31. Similarly, the drive circuit 32b drives the right side direction curtain shield airbag apparatus 8b in accordance with a driving signal received from the collision determining circuit 31.

Figure 3A:
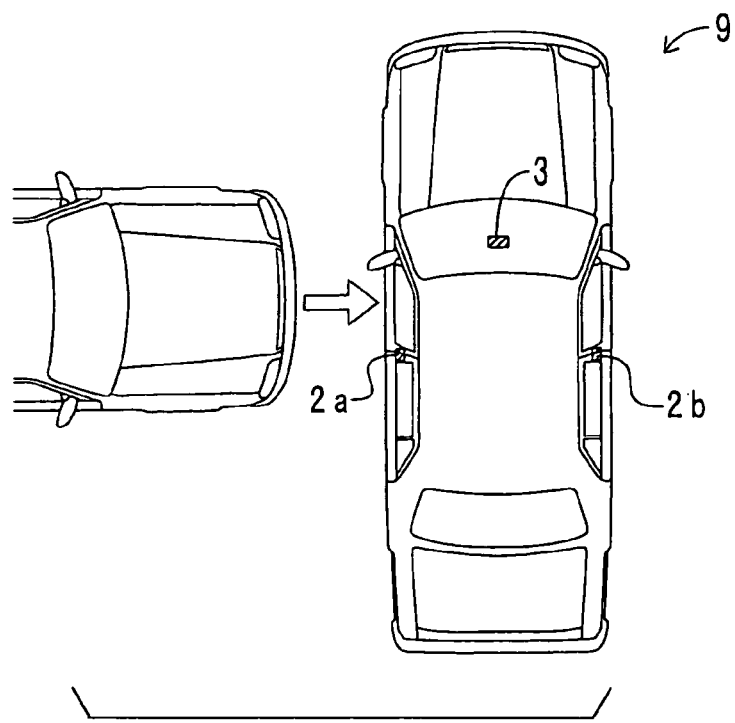
FIGS. 3A and 3B are diagrams showing a model of consecutive side-direction collisions occurring on the left and right sides.
Figure 3B:
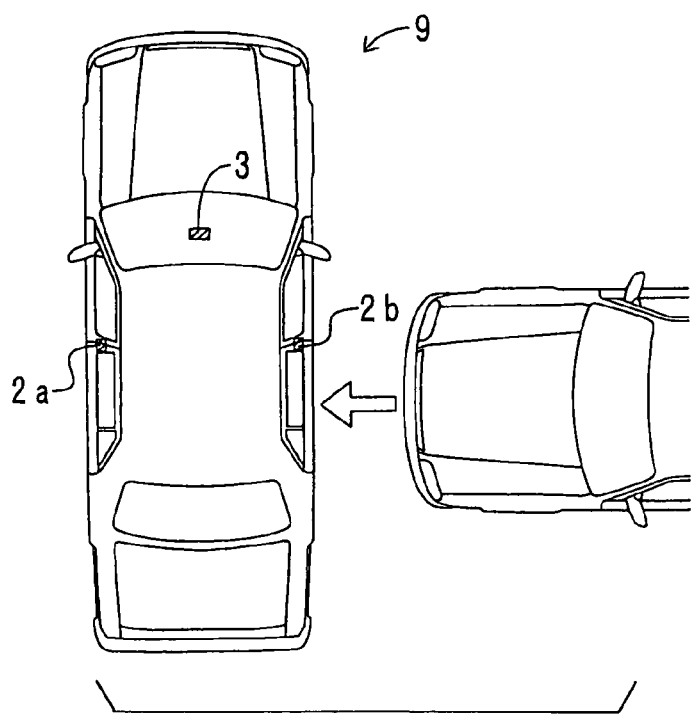

The following description explains operations carried out by the airbag system implemented by the embodiment in the event of consecutive side-direction collisions occurring on the left and right sides. FIGS. 3A-3B are diagrams showing a model of consecutive side-direction collisions occurring on the left and right sides. Specifically, FIG. 3A shows a first side-direction collision on the left side and FIG. 3B shows a second side-direction collision on the right side. FIGS. 4A-4B are diagrams showing flows of signals generated in the event of such consecutive side-direction collisions occurring on the left and right sides.

First, the first side-direction collision on the left side is explained. As shown in FIG. 3A, another vehicle coming from the left side collides with the vehicle body 9. In this case, the left side direction G sensor 2a functions as a main G sensor whereas the right side direction G sensor 2b functions as a safe sensor. When the other vehicle collides with left side of the vehicle body 9, an acceleration waveform is transmitted from the left side direction G sensor 2a to the integration-value-processing circuit 30a through a signal line s1a as shown in FIG. 4A. The integration-value-processing circuit 30a computes a moving average deviation over a predetermined interval of the acceleration waveform. The computed moving average deviation is transmitted to the collision determining circuit 31 through a signal line s2a. The collision determining circuit 31 compares the moving average deviation with a main G threshold value stored in advance. An acceleration waveform is also transmitted from the right side direction G sensor 2b to the integration-value-processing circuit 30b through a signal line s1b. The integration-value-processing circuit 30b computes a moving average deviation over a predetermined interval of the acceleration waveform. The computed moving average deviation is transmitted to the collision determining circuit 31 through a signal line s2b. The collision determining circuit 31 compares the moving average deviation with a safe threshold value stored in advance. When the moving average deviation obtained from the acceleration waveform generated by the left side direction G sensor 2a exceeds the main G threshold value, and the moving average deviation obtained from the acceleration waveform generated by the right side direction G sensor 2b exceeds the safe threshold value, the collision determining circuit 31 transmits a driving signal to the drive circuit 32a though a signal line s3a. In turn, the drive circuit 32a drives the left side direction curtain shield airbag apparatus 8a through a signal line s4a. As a result, a bag of the left side direction curtain shield airbag apparatus 8a is inflated.

Next, the second side-direction collision on the right side is explained. As shown in FIG. 3B, a further vehicle coming from the right side collides with the vehicle body 9. In this case, the right side direction G sensor 2b functions as a main G sensor whereas the left side direction G sensor 2a functions as a safe sensor. When the further vehicle collides with the right side of the vehicle body 9, an acceleration waveform is transmitted from the right side direction G sensor 2b to the integration-value-processing circuit 30b through a signal line s1b as shown in FIG. 4B. The integration-value-processing circuit 30b computes a moving average deviation over a predetermined interval of the acceleration waveform. The computed moving average deviation is transmitted to the collision determining circuit 31 through a signal line s2b. The collision determining circuit 31 compares the moving average deviation with the main G threshold value. When a result of the comparison indicates that the moving average deviation exceeds the main G threshold value, the collision determining circuit 31 transmits a driving signal to the drive circuit 32b though a signal line s3b. However, in the first side-direction collision on the left side, a safe signal for the second side-direction collision on the right side is stored into the collision determining circuit 31 in a latching process. The collision determining circuit 31 transmits the safe signal to the drive circuit 32b though a signal line s5a. When the drive circuit 32b receives both the driving signal from the signal line s3b and the safe signal from the signal line s5a, the drive circuit 32b drives the right side direction curtain shield airbag apparatus 8b through a signal line s4b. As a result, a bag of the right side direction curtain shield airbag apparatus 8b is inflated.

Figure 5A:
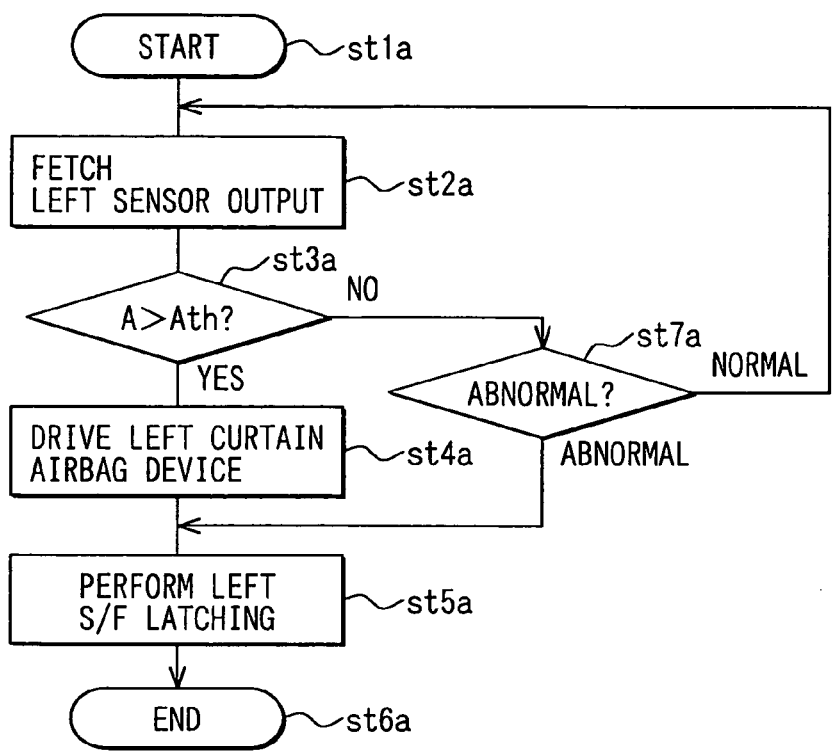
FIGS. 5A and 5B show flowcharts representing processing carried out by the airbag system in the event of a first side-direction collision.
Figure 5B:
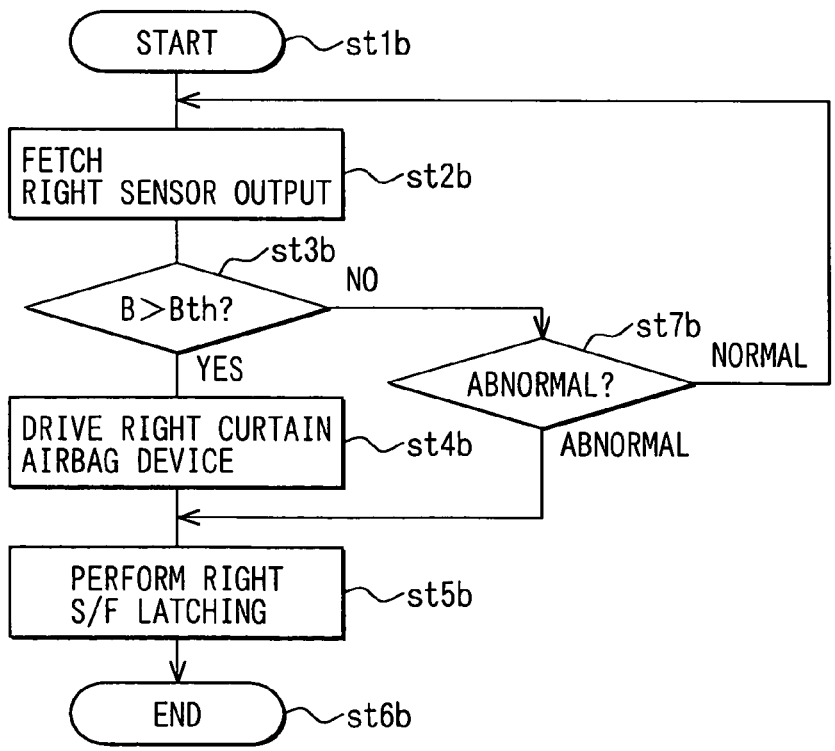

Next, a condition of the latching process of the airbag system implemented by the embodiment is explained. FIGS. 5A-5B show flowcharts representing processing performed by the airbag system implemented by the embodiment in the event of a first side-direction collision. When the first side-direction collision is a collision on the left side, as shown in FIG. 5A, the collision determining circuit 31 fetches a left side direction G output A (a moving average deviation of interval integration by the left side direction G sensor 2a on an acceleration waveform) (at Steps st1a and st2a). Then, the left side direction G output A is compared with a main G threshold value $A_{th}$ (at Step st3a). When the result of the comparison is $A > A_{th}$ and a moving average deviation of interval integration by the right side direction G sensor 2b on an acceleration waveform is greater than a safe threshold value, a driving signal for the left side direction curtain shield airbag apparatus 8a is output (at Step st4a). Then, a safe signal is latched in preparation for a side-direction collision on the right side (at Steps st5a and st6a). When the result of the comparison of the left side direction G output A with the main G threshold value $A_{th}$ (obtained at Step st3a) is $A < A_{th}$, on the other hand, an abnormality diagnosis is carried out (at Step st7a). When the diagnosis is concluded to be normal, the flow of the processing returns to the step of fetching a left side direction G output A (Step st2a). When the diagnosis is concluded to be abnormal, a safe signal is latched in preparation for a side-direction collision on the right side (at Steps st5a and st6a).

When the first side-direction collision is a collision on the right side, as shown in FIG. 5B, the collision determining circuit 31 fetches a right side direction G output B (a moving average deviation of interval integration by the right side direction G sensor 2b on an acceleration waveform) (at Steps st1b and st2b). Then, the right side direction G output B is compared with a main G threshold value $B_{th}$ (at Step st3b). When the result of the comparison is $B > B_{th}$ and a moving average deviation of interval integration by the left side direction G sensor 2a on an acceleration waveform is greater than a safe threshold value, a driving signal for the right side direction curtain shield airbag apparatus 8b is output (at Step st4b). Then, a safe signal is latched in preparation for a side-direction collision on the left side (at Steps st5b and st6b). When the result of the comparison of the right side direction G output B with the main G threshold value $B_{th}$ (obtained at Step st3b) is $B < B_{th}$, an abnormality diagnosis is carried out (at Step st7b). When the diagnosis is concluded to be normal, the flow of the processing returns to the step of fetching a right side direction G output B (Step st2b). When the diagnosis is concluded to be abnormal, a safe signal is latched in preparation for a side-direction collision on the left side (at Steps st5b and st6b).

When the second side-direction collision is a collision on the right side (that is, when the first side-direction collision is a collision on the left side), a driving signal for the right side direction curtain shield airbag apparatus 8b (output at Step st4b) and a safe signal (latched at Step st5a) are both supplied to the drive circuit 32b to drive the right side direction curtain shield airbag apparatus 8b.

When the second side-direction collision is a collision on the left side (that is, when the first side-direction collision is a collision on the right side), a driving signal for the left side direction curtain shield airbag apparatus 8a (output at Step st4a) and a safe signal (latched at Step st5b) are both supplied to the drive circuit 32a to drive the left side direction curtain shield airbag apparatus 8a.

Next, operating effects of the airbag system implemented by this embodiment are explained. The airbag system 1 implemented by this embodiment performs an AND operation on signals from the left side direction G sensor 2a and the right side direction G sensor 2b, which are provided on both the width-direction sides of the vehicle, to drive the left side direction curtain shield airbag apparatus 8a and the right side direction curtain shield airbag apparatus 8b. Thus, the operating reliability is high.

In addition, in accordance with the airbag system 1 implemented by this embodiment, only the left side direction G sensor 2a and the right side direction G sensor 2b contribute to determination of whether the left side direction curtain shield airbag apparatus 8a and the right side direction curtain shield airbag apparatus 8b are to be driven or not to be driven. Thus, in determination of a side-direction collision, another acceleration sensor such as an acceleration sensor embedded in the airbag ECU 3 itself is not required.

Furthermore, in accordance with the airbag system 1 implemented by this embodiment, a signal from the left side direction G sensor 2a is temporarily stored by a latching process after a first side-direction collision on the left side. The stored signal is used as a safe signal for a second side-direction collision on the right side. Thus, even when problems are raised in components such as the left side direction G sensor 2a and the signal line s1a in the first side-direction collision on the left side, the right side direction curtain shield airbag apparatus 8b can be driven in the second side-direction collision on the right side with a high degree of reliability.

Second Embodiment

A second embodiment different from the first embodiment will now be discussed. In the second embodiment, a left side direction main G sensor and a left side direction safe sensor provided as a substitute for the left side direction G sensor. In addition, a right side direction main G sensor and a right side direction safe sensor are provided as a substitute for the right side direction G sensor.

Figure 6:
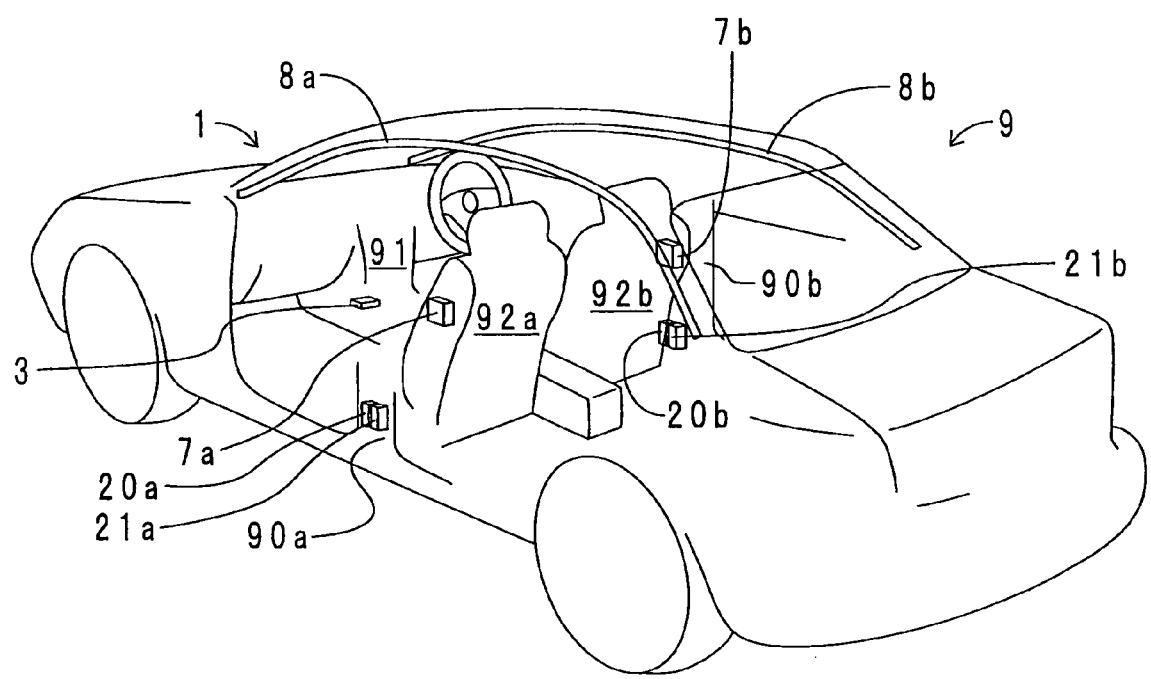
FIG. 6 is a diagram showing a layout of an airbag system implemented by a second embodiment.

FIG. 6 is a diagram showing a layout of the airbag system implemented by this embodiment. In this figure, members identical with their respective counterparts shown in FIG. 1 are each denoted by the same reference numeral as the counterpart. A left side direction main G sensor 20*a* and a left side direction safe sensor 21*a* are provided at locations adjacent to each other on a left side direction B pillar 90*a*. Each of the left side direction main G sensor 20*a* and the left side direction safe sensor 21*a* constitutes an acceleration sensor.

A right side direction main G sensor 20*b* and a right side direction safe sensor 21*b* are provided at locations adjacent to each other on a right side direction B pillar 90*b*. Each of the right side direction main G sensor 20*b* and the right side direction safe sensor 21*b* also constitutes an acceleration sensor.

Figure 7:
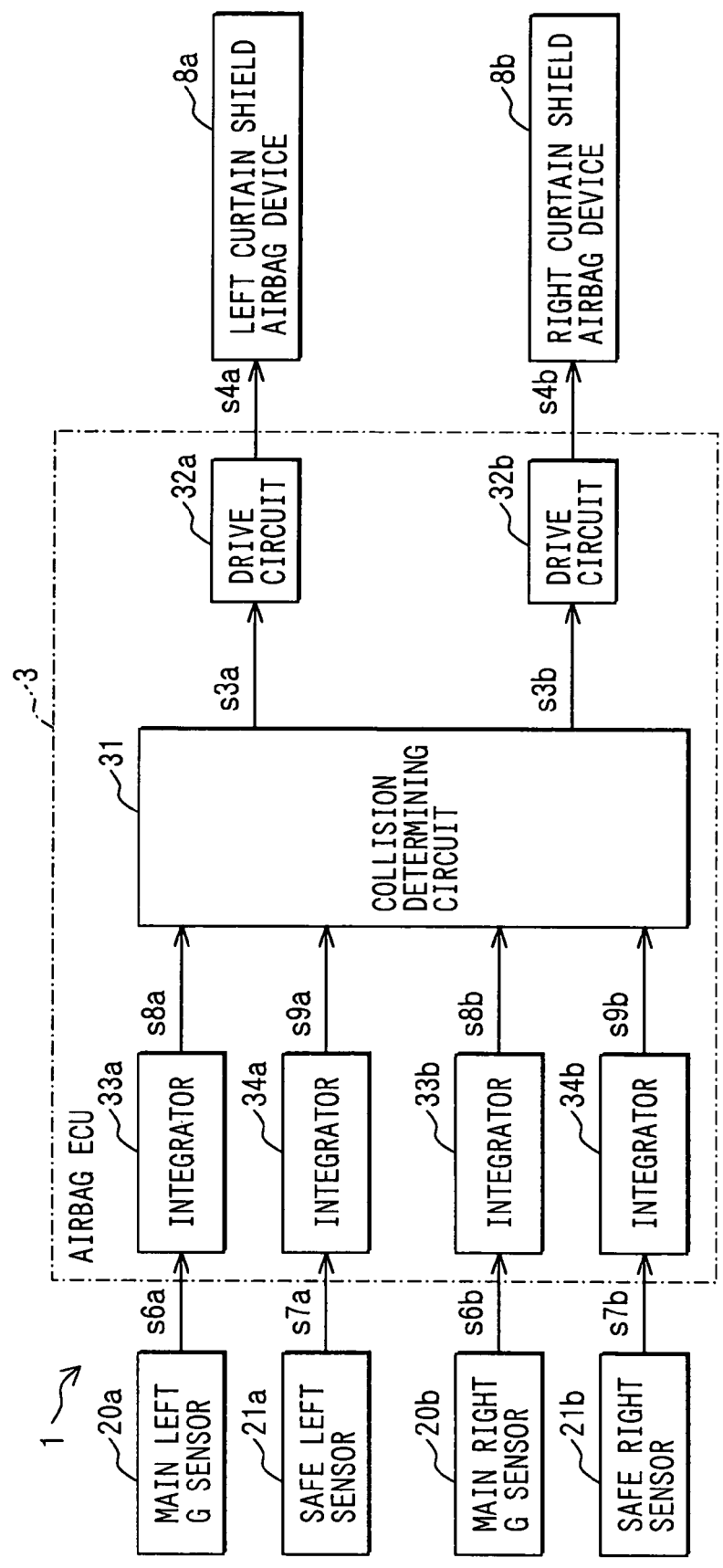
FIG. 7 is a block diagram showing the airbag system implemented by the second embodiment.

FIG. 7 is a block diagram showing the airbag system implemented by the embodiment. In this figure, members identical with their respective counterparts shown in FIG. 2 are each denoted by the same reference numeral as the counterpart. As shown in FIG. 7, the left side direction main G sensor 20*a* is connected to an integration-value-processing circuit 33*a*. The left side direction safe sensor 21*a* is connected to an integration-value-processing circuit 34*a*. The right side direction main G sensor 20*b* is connected to an integration-value-processing circuit 33*b*. The right side direction safe sensor 21*b* is connected to an integration-value-processing circuit 34*b*.

FIGS. 8A-8B are diagrams showing flows of signals generated in the event of consecutive side-direction collisions occurring on the left and right sides. It is to be noted that, in this figure, members identical with their respective counterparts shown in FIGS. 4A-4B are each denoted by the same reference numeral as the counterpart. First, a first side-direction collision on the left side is explained. In a side-direction collision on the left side, an acceleration waveform is transmitted from the left side direction main G sensor 20*a* to the integration-value-processing circuit 33*a* through a signal line s6*a* as shown in FIG. 8A. The integration-value-processing circuit 33*a* computes a moving average deviation over a predetermined interval of the acceleration waveform. The computed moving average deviation is transmitted to the collision determining circuit 31 through a signal line s8*a*. The collision determining circuit 31 compares the moving average deviation with a main G threshold value stored in advance. An acceleration waveform is transmitted from the right side direction safe sensor 21*b* to the integration-value-processing circuit 34*b* through a signal line s7*b*. The integration-value-processing circuit 34*b* computes a moving average deviation over a predetermined interval of the acceleration waveform. The computed moving average deviation is transmitted to the collision determining circuit 31 through a signal line s9*b*. The collision determining circuit 31 compares the moving average deviation with a safe threshold value stored in advance. The collision determining circuit 31 transmits a driving signal to the drive circuit 32*a* though a signal line s3*a* when the moving average deviation obtained from the acceleration waveform generated by the left side direction main G sensor 20*a* exceeds the main G threshold value and the moving average deviation obtained from the acceleration waveform generated by the right side direction safe sensor 21*b* exceeds the safe threshold value. In turn, the drive circuit 32*a* drives the left side direction curtain shield airbag apparatus 8*a* through a signal line s4*a*. As a result, a bag of the left side direction curtain shield airbag apparatus 8*a* is inflated.

Next, the second side-direction collision on the right side is explained. As shown in FIG. 8B, in a side-direction collision on the right side, an acceleration waveform is transmitted from the right side direction main G sensor 20*b* to the integration-value-processing circuit 33*b* through a signal line s6*b*. The integration-value-processing circuit 33*b* computes a moving average deviation over a predetermined interval of the acceleration waveform. The computed moving average deviation is transmitted to the collision determining circuit 31 through a signal line s8*b*. The collision determining circuit 31 compares the moving average deviation with the main G threshold value. The collision determining circuit 31 transmits a driving signal to the drive circuit 32*b* though a signal line s3*b* when a result of the comparison indicates that the moving average deviation exceeds the main G threshold value. In the first side-direction collision on the left side, a safe signal for the second side-direction collision on the right side is stored into the collision determining circuit 31 in a latching process. The collision determining circuit 31 transmits the safe signal to the drive circuit 32*b* though a signal line s5*a*. When the drive circuit 32*b* receives both the driving signal from the signal line s3*b* and the safe signal from the signal line s5*a*, the drive circuit 32*b* drives the right side direction curtain shield airbag apparatus 8*b* through a signal line s4*b*. As a result, a bag of the right side direction curtain shield airbag apparatus 8*b* is inflated.

The airbag system 1 implemented by this embodiment exhibits the same effects as the airbag system implemented by the first embodiment.

In addition, in accordance with the airbag system 1 implemented by this embodiment, the precision of the acceleration detection is improved. That is, in the first embodiment, a single left side direction G sensor functions as both a main G sensor for collisions in a side direction on the left side and a safe sensor for collisions in a side direction on the right side. Also, a single right side direction G sensor functions as both a main G sensor for collisions in a side direction on the right side and a safe sensor for collisions in a side direction on the left side. In the case of a collision in a side direction on the left side, for example, the left side direction G sensor experiences a large acceleration but the right side direction G sensor experiences a small acceleration. Also, in the case of a collision in a side direction on the right side, the right side direction G sensor experiences a large acceleration but the left side direction G sensor experiences a small acceleration. It is thus necessary to ensure a relatively broad sensing range for the left and right side direction G sensors.

In accordance with the airbag system 1 implemented by this embodiment, the left side direction main G sensor 20*a* and the left side direction safe sensor 21*a* are provided on the left side direction B pillar 90*a*. The left side direction main G sensor 20*a* is used only for collisions in a side direction on the left side. That is, in a collision in a side direction on the left side, the left side direction main G sensor 20*a* functions as a main G sensor. Thus, the sensing range of the left side direction main G sensor 20*a* needs to be ensured for only relatively large accelerations. On the other hand, the left side direction safe sensor 21*a* is used only for collisions in a side direction on the right side. That is, in a collision in a side direction on the right side, the left side direction safe sensor 21*a* functions as a safe sensor. Thus, the sensing range of the left side direction safe sensor 21*a* needs to be ensured for only relatively small accelerations. The sensing ranges of the right side direction main G sensor 20*b* and the right side direction safe sensor 21*b*, which are provided on the right side direction B pillar 90*b*, need to be ensured for only their respective acceleration domains, which are different from each other. Thus, in accordance with the airbag system 1 implemented by this embodiment, the sensing range of each sensor can be narrowed. As a result, the precision of the acceleration detection can be improved.

Other Embodiments

Embodiments implementing the passenger protection apparatus provided by the present invention have been described so far. However, embodiments for implementing the passenger protection apparatus are not limited to the configurations explained above. A person skilled in the art is capable of creating a variety of modified or improved embodiments.

For example, in the embodiments described above, a driving signal received from the signal line s3b and a latched safe signal received from the signal line s5a (as shown in FIGS. 4A-4B and 8A-8B) are subjected to an AND operation performed on the input side of the drive circuit 32b. However, the AND operation can also be carried out, for example, on the input side of the collision determining circuit 31.

In addition, in the embodiments described above, when the result of the comparison of the left side direction G output A with the main G threshold value $A_{th}$ is $A > A_{th}$, a latching process is carried out (as shown in FIGS. 5A-5B). That is, an event in which a signal from the main G sensor (that is the left side direction G sensor 2a in the first embodiment or the left side direction main G sensor 20a in the second embodiment) exceeds the main G threshold value is used as a trigger for carrying out the latching process. However, an event in which a signal from the safe sensor (that is the right side direction G sensor 2b in the first embodiment or the right side direction safe sensor 21b in the second embodiment) exceeds the safe threshold value can also be used as a trigger for carrying out the latching process. As a possible alternative, a state in which the signal from the main G sensor exceeds the main G threshold value and the signal from the safe sensor exceeds the safe threshold value is used as a trigger for carrying out the latching process. As another possible alternative, an event in which a signal exceeds a threshold value set separately for the latching process is used as a trigger for carrying out the latching process.

In addition, while the left side direction curtain shield airbag apparatus 8a and the right side direction curtain shield airbag apparatus 8b are driven in the embodiments described above, a left side direction airbag apparatus 7a and a right side direction airbag apparatus 7b (which are shown in FIGS. 1 and 6) can also be driven.

Furthermore, even though interval integration values are used in the integration-value-processing circuits 30a, 30b, 33a, 33b, 34a, and 34b employed in the embodiments described above, integration values or values output by various kinds of filter processing can also be used. In addition, while acceleration sensors (that is, the left side direction G sensor 2a and the right side direction G sensor 2b employed in the first embodiment as well as the left side direction main G sensor 20a, left side direction safe sensor 21a, right side direction main G sensor 20b, and right side direction safe sensor 21b employed in the second embodiment) are provided on the B pillar, they can also be installed, for example, on the A pillar, the C pillar, a front-seat door, or a rear-seat door. In addition, the number of acceleration sensors is also not specifically limited either.

In the embodiments described above, the number of side-direction collisions is two, which represents one collision on the right side and one collision on the left side. It is to be noted, however, that the passenger protection apparatus according to the present invention is not limited to the case in which collisions occur only twice, that is, once on the left side and once on the right side. Generally, the passenger protection ECU latches a signal generated in an (n-1)th side-direction collision by the acceleration sensor provided on a colliding width-direction side (where $n \geq 2$) when consecutive side-direction collisions occur on the left and right width-direction sides. Further, in an nth side-direction collision, the passenger protection ECU uses the latched signal as a safe signal and a signal from the acceleration sensor provided on a colliding width-direction side as a main G signal.

In an nth side-direction collision, the passenger protection ECU uses the latched signal as a safe signal and a signal from the acceleration sensor provided on a colliding width-direction side as a main G signal.

In addition, the passenger protection system provided by the present invention can be applied to not only an airbag system, but also other passenger protection apparatus including a seat-belt pretensioner. Moreover, a timer can be provided for unlatching a latched signal after the lapse of a predetermined period of time in order to avoid unnecessary inflation of the airbag.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A passenger protection system, comprising:
   an acceleration sensor provided on each of two width-direction sides of a vehicle; and
   a passenger protection ECU for determining if a collision has occurred and driving a passenger protection apparatus accordingly,
   wherein the passenger protection ECU drives the passenger protection apparatus based on a signal from the acceleration sensor provided on a one of the width-direction sides of the vehicle experiencing the collision, and a signal from the acceleration sensor provided on the other width-direction side not experiencing the collision when the passenger protection ECU determines the collision has occurred,
   the passenger protection ECU drives the passenger protection apparatus based upon an AND operation performed on the signal from the acceleration sensor provided on the one of the width-direction sides of the vehicle experiencing the collision, and the signal from the acceleration sensor provided on the other width-direction side not experiencing the collision, and
   the passenger protection ECU latches a signal generated in an (n-1)th side-direction collision (where $n \geq 2$) by the acceleration sensor provided on a width-direction side experiencing the (n-1)th side-direction collision when consecutive side-direction collisions occur on the left and right width-direction sides and, in an nth side-direction collision, the passenger protection ECU uses the latched signal as a safe signal and a signal from the acceleration sensor provided on a width-direction side experiencing the nth side-direction collision as a main G signal.

2. The passenger protection system according to claim 1, wherein the passenger protection ECU has a collision determining circuit for determining an abnormality of the vehicle, and when an output value of the acceleration sensor on the collision side is not larger than a first threshold value at a first collision, and the collision determining circuit determines the abnormality, the passenger protection ECU performs latching of the output value.

3. The passenger protection system according to claim 2, wherein when the output value of the acceleration sensor on the collision side is not larger than the first threshold value at the first collision, and an output value of the acceleration sensor on the side opposite to the collision side is larger than a second threshold value, the passenger protection ECU performs the latching of the output value of the acceleration sensor on a collision side.

4. The passenger protection system according to claim 3, wherein when the output value of the acceleration sensor on the collision side is larger than the first threshold value at the first collision, the passenger protection ECU performs the latching of the output value.

5. The passenger protection system according to claim 2, wherein when the output value of the acceleration sensor on the collision side is larger than the first threshold value at the first collision, the passenger protection ECU performs the latching of the output value.

6. A passenger protection system, comprising:
an acceleration sensor provided on each of two opposite sides of a vehicle; and
a passenger protection ECU for determining if a collision has occurred and driving a passenger protection apparatus accordingly,
wherein, when the passenger protection ECU determines a collision has occurred, the passenger protection ECU drives the passenger protection apparatus based on an AND operation performed on a signal from the acceleration sensor provided on the one of the sides of the vehicle that is experiencing the collision and a signal from the acceleration sensor provided on the other side, and
when the collision is a consecutive opposite side-direction collision, the passenger protection ECU latches a signal generated in a previous opposite side-direction collision by the acceleration sensor provided on the side that experienced the previous opposite side-direction collision, and the passenger protection ECU uses the latched signal as a safe signal and the signal from the acceleration sensor provided on the one of the sides of the vehicle that is experiencing the collision as a main G signal.

7. A passenger protection system, comprising:
an acceleration sensor provided on each of two opposite sides of a vehicle;
a passenger protection ECU for determining if a collision has occurred and driving a passenger protection apparatus accordingly; and
a collision determining circuit for determining an abnormality of the vehicle,
wherein the ECU determines the presence of collisions based on output values of signals of the acceleration sensors,
the ECU latches the signal of an acceleration sensor when the output value of the signal exceeds a first threshold value and when the collision determining circuit determines the abnormality, and
when the passenger protection ECU determines a collision has occurred, the passenger protection ECU drives the passenger protection apparatus based on an AND operation performed on a signal from the acceleration sensor provided on the one of the sides of the vehicle that is experiencing the collision and a signal from the acceleration sensor provided on the other side.

8. The passenger protection system according to claim 7, wherein when the collision is a consecutive opposite side-direction collision, the passenger protection ECU uses the latched signal as a safe signal and the signal from the acceleration sensor provided on the one of the sides of the vehicle that is experiencing the collision as a main G signal.

9. The passenger protection system according to claim 7, wherein when an output value of the acceleration sensor on the side opposite to the collision side is larger than a second threshold value, the passenger protection ECU latches the signal of the acceleration sensor on a collision side.

* * * * *